UNITED STATES PATENT OFFICE.

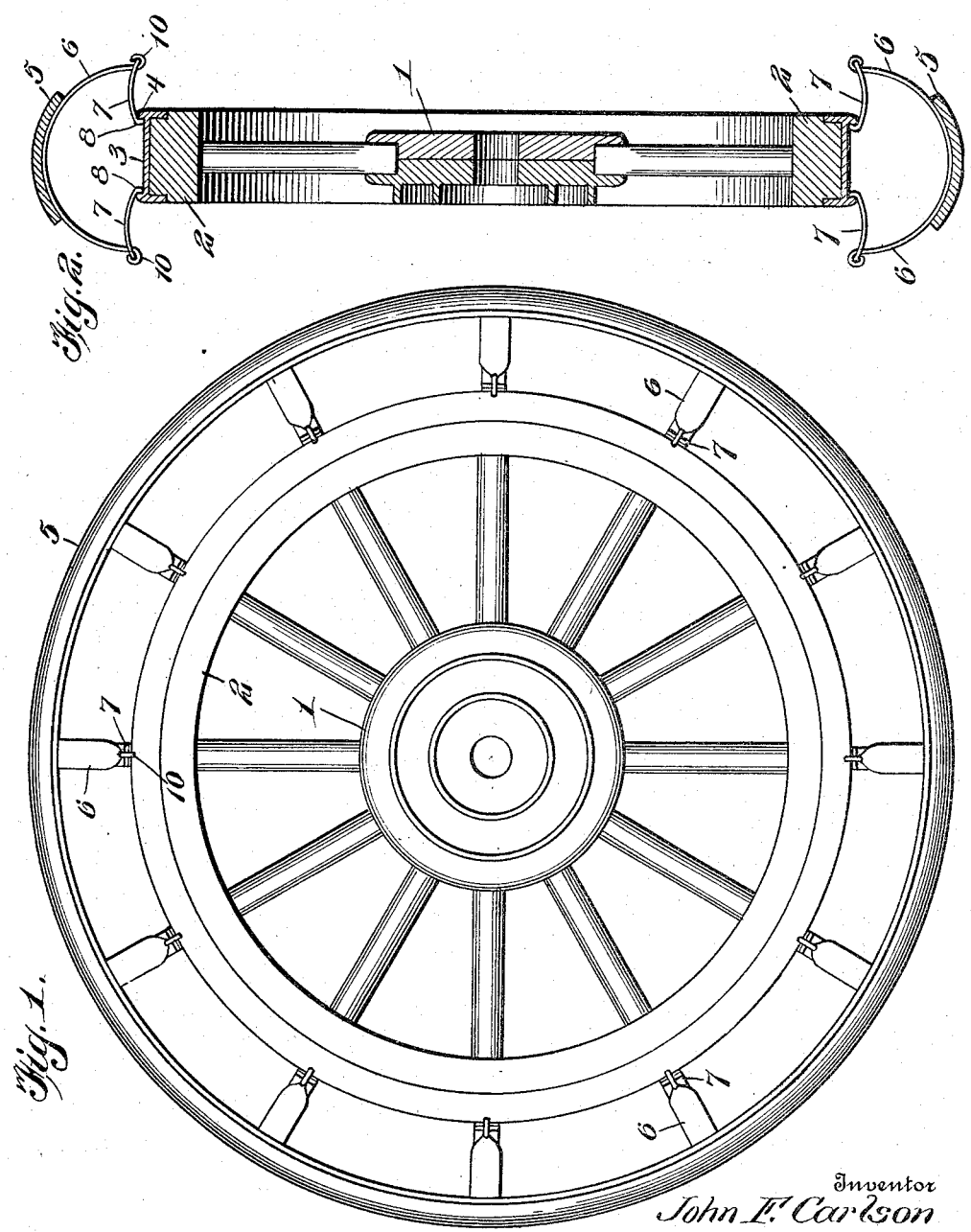

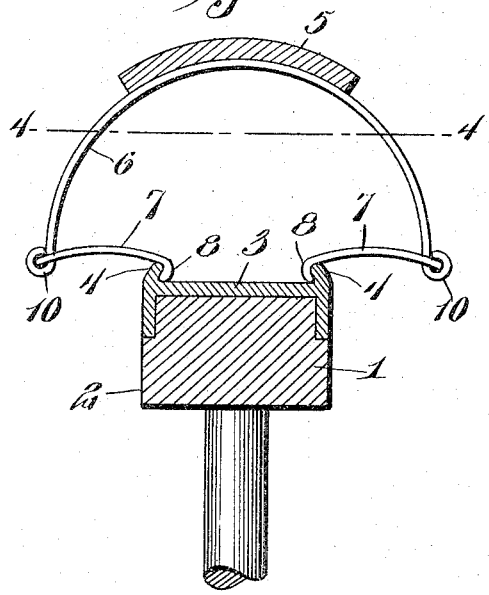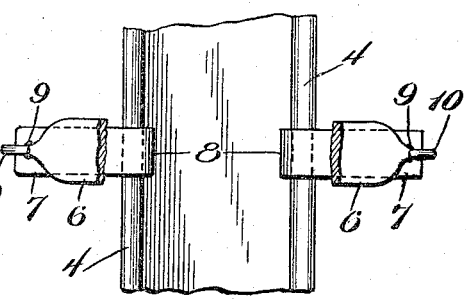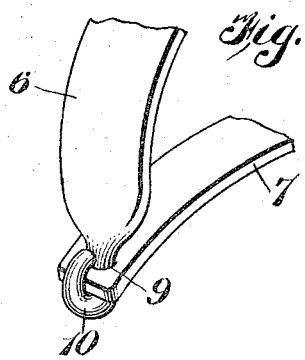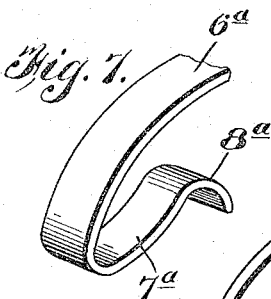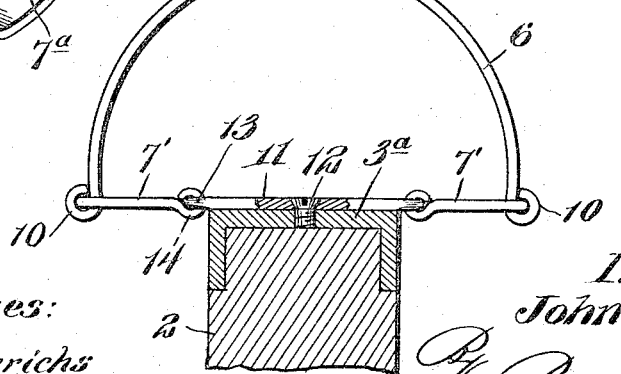

JOHN F. CARLSON, OF ATTICA, INDIANA.

RESILIENT TIRE.

1,192,495. Specification of Letters Patent. Patented July 25, 1916.

Application filed May 24, 1915. Serial No. 30,010.

*To all whom it may concern:*

Be it known that I, JOHN F. CARLSON, a citizen of the United States, residing at Attica, in the county of Fountain and State of Indiana, have invented certain new and useful Improvements in Resilient Tires, of which the following is a specification.

This invention relates to an improved vehicle tire, contemplating particularly the provision of a spring tire adapted to afford the cushioning effect of a pneumatic tire while obviating its disadvantages.

The particular object of the invention is to provide an outer rim of spring metal coupled by yielding or spring connections with the wheel felly, whereby a tire of sufficient rigidity to support the load and resiliency to give the required cushioning action is produced.

A further object of the invention is to provide a resilient outer rim and resilient connections between the same and the wheel, whereby said outer rim is normally held securely in position, but may be removed with said resilient connection for repairs or other purposes in a ready and convenient manner.

A still further object of the invention is to provide a resilient outer rim and cushion attaching means therefor which are simple and comparatively inexpensive of construction and, at the same time, reliable and efficient in action.

The invention consists in the features of construction, combination and arrangement of parts hereinafter more fully described and claimed, reference being had to the accompanying drawings, in which—

Figure 1 is a side elevation of a vehicle wheel equipped with my improved resilient tire; Fig. 2 is a vertical transverse section through the wheel; Fig. 3 is a vertical section through a portion of the wheel on an enlarged scale; Fig. 4 is a detail sectional view on the line 4—4 of Fig. 3; Fig. 5 is a detail fragmentary perspective view of one of the bowed backing springs and coupling arms; Fig. 6 is a view similar to Fig. 3 showing a modified form of construction; and Fig. 7 is a view similar to Fig. 5, showing another modified form of construction.

Referring to Figs. 1 to 5, inclusive, of the drawings, 1 designates a vehicle wheel of suitable construction and provided with a felly 2 to which is suitably secured a channeled metallic tire carrying or supporting ring 3, the outer face of which is provided with parallel retaining flanges 4 or their equivalent. The ring 3 may be split to enable the same to be positioned on a wheel felly after the sections of the felly are assembled. Surrounding the ring 3 is an outer metallic rim 5, comprising an annular band of spring steel or other appropriate metal, which is preferably curved in cross section and of suitable width with respect to the wheel rim.

The outer rim 5 is carried by an annular series of bowed backing springs 6, which extend transversely of the wheel and are interposed between the channeled ring and the outer rim. The central portions of the convex surfaces of these backing springs are suitably fastened to the outer rim and the ends of said springs extend laterally in opposite directions beyond the sides of the wheel and terminate at their extremities substantially in transverse alinement with the ring 3 or the retaining flanges 4.

The ends of the respective backing springs are united to the channeled ring 3 by yielding connections, in the form of curved spring arms or link members 7, said arms having hooked inner ends 8 which engage over and pivotally interlock with the flanges 4, and apertured outer ends 9 which receive and engage hooks or eyes 10 upon the ends of the springs 6 which are offset or humped, to form retaining shoulders whereby the ends of the arms are slidably and pivotally connected with the ends of the bowed springs and are yet held from casual disconnection. It will be observed that, owing to their curved formation, the spring arms 7 are adapted to freely bend or flex without liability of the inner hooked ends of the arms becoming disengaged from the retaining flanges.

It will be evident from the construction described that when the weight of the load falls upon the load-sustaining portion of the outer rim 5, said outer rim, will yield inwardly against the resistance of the adjacent springs 6, which springs 6 will be contracted through the action of the curved resilient link arms 7, by which the weight of the load will be cushioned or yieldingly sustained and all shocks and jars taken up in an effective manner. The tire is thus adapted to perform all the functions of a pneumatic tire while free from its disadvantages.

In the form of my invention shown in Fig. 6, the supporting ring 3ª is flangeless and cleats 11 extend across the face of the ring at intervals and are secured thereto by suitable fastening devices 12, the ends of the cleats being extended beyond the sides of the ring and provided with eyes 13 to receive eyes 14 upon the inner ends of the coupling arms or links 7', which may be jointed to the ends of the spring 6 in the manner previously described.

In the form of my invention illustrated in Fig. 7, I have shown another modification in which the spring arms 7ª are provided with hooked ends 8ª for engagement with the flanges 4 of the ring 3 and are integral at their outer ends with the spring 6ª, this construction being efficient in some cases.

It will be observed that the general principle of the invention is preserved throughout the several forms disclosed, namely, that an annular outer rim is supported in spaced relation to a supporting or carrier ring by bowed cushioning and backing springs, which are yieldingly jointed at their ends to the supporting ring whereby the bowed springs are permitted to extend and contract, thus cushioning the movements of the outer rim in a highly efficient manner.

I claim as my invention:

1. A vehicle tire including a supporting ring, an outer rim, an annular series of spaced, separate and independent bowed springs extending transversely between the supporting ring and outer rim with their concaved sides facing the supporting ring and their end portions projecting laterally beyond the sides of the supporting ring and substantially in line with the face of said ring, and yielding connections between the ends of the bowed springs and the adjacent sides of the supporting ring.

2. A vehicle tire including a supporting ring, an outer rim, an annular series of spaced, separate and independent bowed springs extending transversely between the supporting ring and outer rim with their concaved sides facing the supporting ring and their end portions projecting laterally beyond the sides of the supporting ring and substantially in line with the face of said ring, and pivotal connections between the ends of the springs and the supporting ring.

3. A vehicle tire including a supporting ring, an outer rim, an annular series of spaced, separate and independent bowed springs extending transversely between the supporting ring and outer rim with their concaved sides facing the supporting ring and their end portions projecting laterally beyond the sides of the supporting ring and substantially in line with the face of said ring, and curved resilient links joining the ends of the bowed springs to the adjacent sides of the supporting ring, whereby the bowed springs may be compressed inwardly toward the ring and laterally thereof.

4. A vehicle tire including a supporting ring, an outer rim, an annular series of spaced, separate and independent bowed springs extending transversely between the supporting ring and outer rim with their concaved sides facing the supporting ring and their end portions projecting laterally beyond the sides of the supporting ring and substantially in line with the face of said ring, and bowed spring metal links pivotally connecting the ends of the springs with the adjacent sides of the supporting ring.

5. A vehicle tire including a supporting ring, an outer rim, an annular series of spaced, separate and independent bowed springs extending transversely between the supporting ring and outer rim with their concaved sides facing the supporting ring and their end portions projecting laterally beyond the sides of the supporting ring and substantially in line with the face of said ring, and oppositely disposed coupling members pivotally connecting the respective ends of the bowed springs with the respective adjacent sides of the supporting ring.

6. A vehicle tire including a supporting ring, an outer rim, springs disposed transversely between the ring and rim, said springs being separate from and independent of each other, and coupling members independently and pivotally connecting the respective ends of the springs with the respective adjacent sides of the supporting ring, the said coupling members being resilient to permit side motion of the springs.

7. A vehicle tire including a supporting ring having undercut flanges at its sides, an outer rim, a series of separate and independent bowed springs disposed transversely between the ring and rim and projecting at their ends beyond the sides of the ring, and links pivotally connected at their outer ends with the respective springs and having hooked inner ends pivotally engaging the undercut flanges of the supporting ring.

8. A vehicle tire including a supporting ring, an outer rim, and an annular series of spaced, separate and independent bowed springs extending transversely between the supporting ring and outer rim with their concaved sides facing the supporting ring and their end portions projecting laterally beyond the sides of the supporting ring and substantially in line with the face of said ring and laterally extending resilient links at the opposite sides of the supporting ring and pivotally coupling the ends of the bowed springs thereto.

In testimony whereof I affix my signature in presence of two witnesses.

JOHN F. CARLSON.

Witnesses:
J. ERNEST RODENBECK,
LENNA THOMPSON.

Copies of this patent may be obtained for five cents each, by addressing the "Commissioner of Patents, Washington, D. C."